June 28, 1927. 1,633,864

S. L. KLINGELSMITH ET AL

COLLAPSIBLE BABY CARRIAGE

Filed May 12, 1925 2 Sheets-Sheet 1

Inventors
Stuart L. Klingelsmith,
Frederick J. Koephe.
By
Attorney

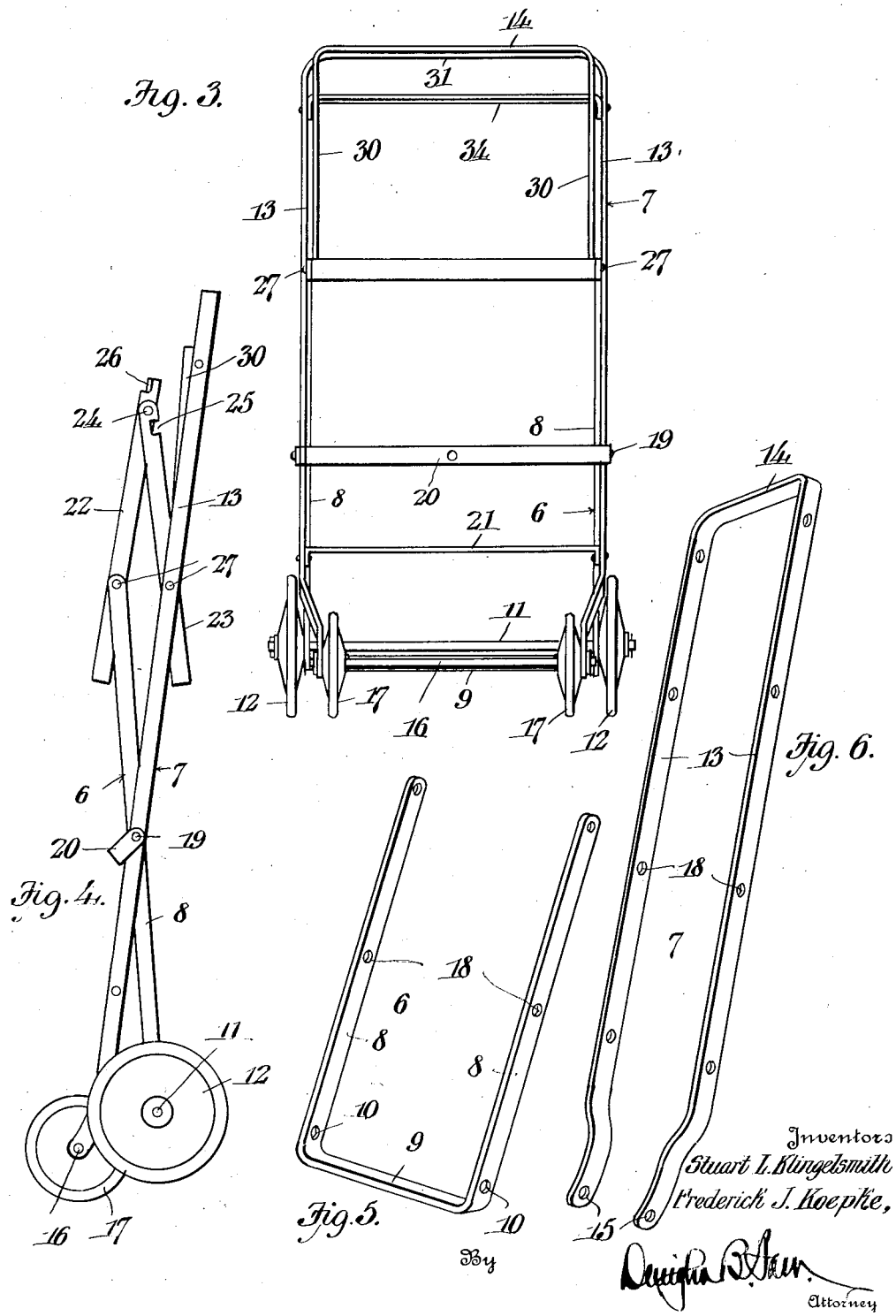

Patented June 28, 1927.

1,633,864

UNITED STATES PATENT OFFICE.

STUART L. KLINGELSMITH, OF ALHAMBRA, AND FREDERICK J. KOEPKE, OF LOS ANGELES, CALIFORNIA.

COLLAPSIBLE BABY CARRIAGE.

Application filed May 12, 1925. Serial No. 29,702.

This invention relates generally to baby buggies or carriages, being particularly applicable to collapsible or foldable devices of this nature.

An object of the invention is to provide a baby carriage capable of being collapsed or "set up" when desired, which occupies but small space when in either condition, and which may either be "set up" or collapsed quickly and with no difficulty.

A further object of the invention is to provide a carriage of the character stated adaptable particularly for use in motor vehicles, in order that a baby may be comfortably supported in reclining position within the vehicle when desired, and which may be collapsed and put away in comparatively small space when it is desired not to use the same.

A still further object is to provide a baby carriage featured by the employment of improved means for holding the same properly within the vehicle when in "set up" position and against the possibility of movement or being over turned due to irregular travel of the vehicle.

A still further object is to provide a collapsible baby carriage which embodies but few extremely simple and readily assembled parts, which has its several parts so constructed and arranged as to afford a great amount of strength in the vehicle and yet which is of light weight, which is featured by the lack of complicated parts or mechanism and which does not require the exercise of special knowledge in its operations, which may be manufactured by simplified processes and extremely low cost, and which will prove highly practical and efficient in use.

With these objects in view, together with others which will appear as the description proceeds, the invention consists in the novel construction, combination and arrangement of parts, all as will be described more fully hereinafter, illustrated in the drawing, and particularly pointed out in the claim.

In the drawings:

Fig. 3 is a front elevation of the baby carriage,

Fig. 4 is a side view of the carriage with the fabric removed and showing the parts in the position they will assume when the carriage is collapsed, and Figs. 5 and 6 are respectively detailed perspective views of the supporting frames of the carriage.

Figure 1:
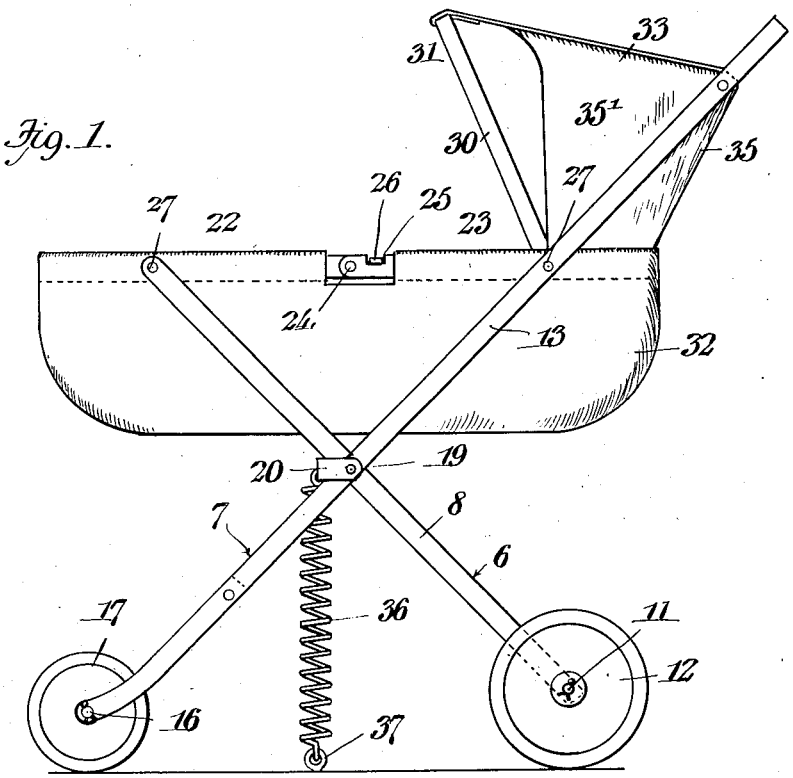
Fig. 1 is a side elevation of a baby carriage constructed in accordance with the invention, the same being shown in "set up" position.
Figure 2:
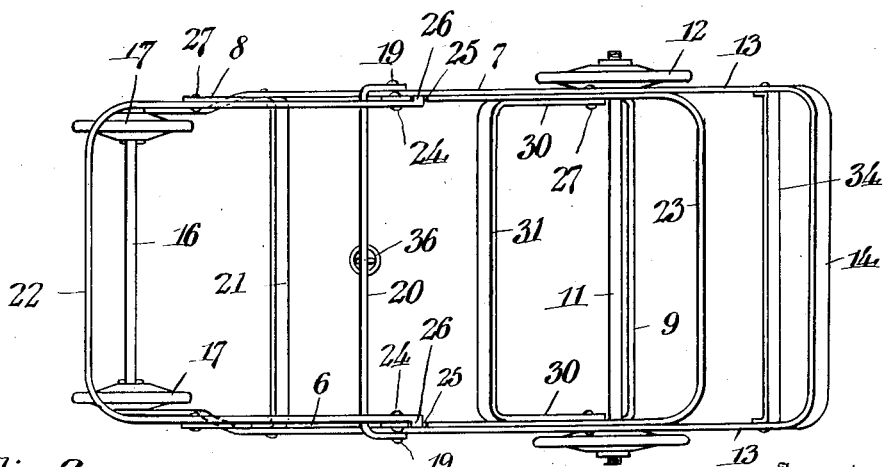
Fig. 2 is a top plan view of the improved carriage with the fabric parts thereof removed for better disclosing the underlying structure.

In carrying out the invention, the frame structures employed are constructed of comparatively thin narrow strip metal, and these strips are so constructed and assembled as to afford maximum strength when the carriage is in "set up" position. The strips are shaped and assembled so as to provide supporting, body and canopy frames, and these frames are associated together in such way as to fold upon each other snugly when the vehicle is collapsed. The body frame carries the fabric sheet of such arrangement as to form a supporting basket for the child or infant, while the canopy frame carries a similar fabric which, when extended, protects the occupant of the body from sun and light rays. These fabric parts fold upon themselves when the body is collapsed so as to lie substantially within the lines of the collapsed frame structures. The vehicle includes primarily supporting frames represented generally at 6 and 7. The frame 6 constitutes an elongated metallic bar bent into substantially U-shape, providing the arms 8 connected together at their lower ends by the cross or bight bar 9. The arms 8 near their lower ends are apertured as at 10 to receive a rear axel 11, on the outer ends of which are rotatably mounted supporting wheels 12.

The frame 7 is formed of a strip somewhat longer than the first mentioned frame, and is bent in substantially inverted U-shape so as to provide spaced parallel arms 13 connected together at their upper ends by the bight or handle bar 14. The free ends of arms 13 are apertured as at 15 to receive a front axel 16 having wheels 17 rotatably mounted thereon. It is preferred with the aim of facilitating collapsing of the frames, that the rear wheels 12 be arranged outside of the arms 8, while the front wheels 17 are confined within the arms 13 of the frame 7.

The frame 6 is of such width as to fit within the frame 7, and at proper points inwardly from the ends of these frames openings 18 are provided for the reception of rivets or studs 19 to pivotally connect the frames together. The rivets 19 also pass through the ends of a cross strut 20, the latter acting as a stabilizer for the crossed frames and maintaining the same in proper spaced relation. The supporting frame 7 may also be equipped with a cross bar 21, arranged substantially midway between the pivots 19 and the lower ends of the arms 13, to lend rigidity to the structure and to prevent collapsing of the same.

The supporting frame above detailed carries a body frame which comprises a pair of U-shaped frame members represented at 22 and 23. These frame members are constructed of metal of substantially similar breadth and thickness as the supporting frame members, and are hingedly connected together at their free ends by bolts or rivets 24. The rear body frame 23 is provided at its upper edge immediately back of the pivots 24 with shallow recesses 25, to receive ears or lateral projections 26 carried by the frame 22. This construction is such that when the frames 22—23 are swung to horizontal alignment, they will be locked against further movement in one direction, by reason of the particular lug and recess arrangement. This arrangement, however, does not interfere with the upward movement of the pivot portions 24.

The side bars of the body frames 22—23 are pivotally connected as at 27 to the supporting frame members 6—7 respectively. The arms 8 of the frame 6 are pivoted at their ends to the frame 22 inwardly from the forward end thereof, while the arms 13 of the frame member 7 pivotally connect, inwardly from their ends, with the arms of the U-shaped frame member 23. It is apparent, therefore, that when the pivotal connection 24 at the meeting ends of the frame 22—23 are moved upwardly, the said frames will fold upon each other in substantially the manner shown in Fig. 4, while the supporting frames 6—7 are permitted to collapse one upon the other. When the pivotal ends of the said body frames are moved downwardly, however, the same will cause the upper ends of the frames 6—7 to move outwardly until the frames 22—23 are substantially horizontally aligned, whereupon engagement of the ears 26 within the recesses 25 will limit further downward movement of the pivotal connections, whereupon the parts will be substantially locked in "set up" position. It is apparent that weight subjected to the frames 22—23 will cause the parts to more firmly lock in extended or "set up" position, and danger of collapsing of the device is overcome.

The pivots 27 connecting the frame 7 with body frame 23 also rockably secure the lower ends of arms 30 of a canopy frame 31. This frame is of substantially inverted U-shape, and is capable of swinging part way over frame 23 or back and within the member 7.

The body frames 22—23 have secured thereto the body fabric represented at 32. This fabric is secured at its upper edges around the bars constituting the frames 22—23, and is of proper depth for the accommodation of an infant or small child. Its flexible nature permits of it collapsing when the carriage is folded, as will be understood. The top bar of the canopy frame 30 has attached thereto the forward edge of a canopy fabric 33, the rear end thereof being attached or passed over a suitable cross member 34 near the upper end of frame member 7, and an apron portion 35 of said fabric passes downwardly to or within the body fabric 32. The canopy may also be equipped with side wings represented generally at 35', for obvious purposes.

The strut 20 has its ends inturned as shown, and the extremities of these inturned portions are pivotally attached to the crossed frames 6—7. A contractile spring 36 is attached at its upper end to the mid portion of the strut 20, and may be looped at its lower end for engagement with an eyelet 37 in a floor, or for engagement with the foot rest of a motor vehicle. It will be understood that in order to engage the lower end of the spring with the fixed support, it will be necesssary to expand the said spring, so that a proper degree of tension is present in the spring when so secured.

The carriage is adapted particularly for use in connection with motor vehicles, so that an infant or small child may be comfortably carried therein. The breadth of the structure, therefore, will be such as to permit of its being positioned upon the floor of the vehicle immediately in the rear of the front seats, and disposed laterally of the vehicle. When so positioned, the spring 36 will be engaged with the eyelet 37 or the toe rail, and the resistance of the spring thus tensioned will maintain the carriage against movement either longitudinally or laterally of the motor vehicle. The child will then be supported immediately behind the front seat and within the convenient reach of the occupants thereof. When it is desired not to so employ the carriage, the same may be collapsed as represented in Fig. 4 of the drawing, and may be stowed away in a luggage carrier or any other suitable place upon the vehicle. When it is desired to employ the carriage as a perambulator, the same will be "set up" as shown in Fig. 1, and the upper end of the frame member 7 will be utilized as a handle.

From the foregoing it is apparent that we have provided a baby carriage of extremely simple construction and yet which will prove highly effective in the accomplishment of the results for which it is intended. By reason of the simplicity of the construction and the manner of assemblage of the several parts, it is at once apparent that the carriage may be manufactured by simplified methods, with a minimum of materials, and in such manner that the completed device may be furnished to the ultimate user at exceedingly small cost.

While the above is a description of the invention in its preferred form, it is apparent that minor variations or changes in the details of construction, the arrangement and assemblage of parts may be liberally resorted to without departing from the spirt of the invention as defined by the claim.

Having thus described our invention, we claim:—

In a baby carriage structure, a pair of supporting frames pivoted together inwardly of their ends, a collapsible body structure carried by said supporting frames, a strut, angular members at the outer ends of said strut, said angular members overlying the outer faces of said supporting frames at their points of crossing, the pivots connecting said supporting frames together also passing through said angular members, whereby portions of said strut operate to limit the movement of said frames in one direction, and wheels at the lower ends of said supporting frames.

In testimony whereof we hereby affix our signatures.

STUART L. KLINGELSMITH.
FREDERICK J. KOEPKE.